(12) United States Patent
Lin

(10) Patent No.: US 8,933,839 B2
(45) Date of Patent: Jan. 13, 2015

(54) SINGLE LOCAL OSCILLATOR FREQUENCY BAND TO RECEIVE DUAL-BAND SIGNALS

(75) Inventor: Qiang Lin, Huntington Beach, CA (US)

(73) Assignee: Qualcomm Incorporated, San Diego, CA (US)

( * ) Notice: Subject to any disclaimer, the term of this patent is extended or adjusted under 35 U.S.C. 154(b) by 1862 days.

(21) Appl. No.: 12/140,113

(22) Filed: Jun. 16, 2008

(65) Prior Publication Data

US 2011/0057837 A1 Mar. 10, 2011

(51) Int. Cl.
*G01S 19/32* (2010.01)
(52) U.S. Cl.
CPC ...................................... *G01S 19/32* (2013.01)
USPC ...................................................... 342/357.72
(58) Field of Classification Search
USPC ...................................................... 342/357.72
See application file for complete search history.

(56) References Cited

U.S. PATENT DOCUMENTS

| 5,040,240 | A | * | 8/1991 | Keegan | 455/260 |
| 5,678,169 | A | * | 10/1997 | Turney | 455/1 |
| 5,883,597 | A | * | 3/1999 | DeWulf | 342/357.72 |
| 6,675,003 | B1 | * | 1/2004 | Dubash et al. | 455/302 |
| 7,551,127 | B2 | * | 6/2009 | Dubash et al. | 342/357.64 |
| 7,859,453 | B2 | * | 12/2010 | Rowitch et al. | 342/357.29 |
| 2006/0176215 | A1 | * | 8/2006 | Dubash et al. | 342/357.06 |
| 2008/0119157 | A1 | * | 5/2008 | Watanabe | 455/302 |

OTHER PUBLICATIONS

Utsurogi, Y. et al., "A Dual-band Image-reject Mixer for GPS with 64dB Image Rejection," Proceedings of the 2004 Asia and South Pacific Design Automation Conference, 0-7803-8175-0/04 IEEE, two pages.

* cited by examiner

*Primary Examiner* — Frank J McGue
(74) *Attorney, Agent, or Firm* — Bay Area Technology Law Group PC

(57) ABSTRACT

A dual-band GPS receiver and method and apparatus for downconversion of dual-band GPS signals. A dual-band GPS receiver in accordance with the present invention comprises an antenna, a Radio Frequency (RF) section, coupled to the antenna, and a baseband section, coupled to the RF section, wherein the RF section comprises a receiver, the receiver receiving signals from a first GPS frequency band and a second GPS frequency band, a local oscillator having a local oscillator frequency, and a mixer, coupled to the receiver and the local oscillator, for selectively mixing the local oscillator frequency with the first GPS frequency band and a second GPS frequency band, wherein the local oscillator frequency downconverts the first GPS frequency band and the second GPS frequency band into a common downconversion frequency band.

18 Claims, 6 Drawing Sheets

SINGLE LOCAL OSCILLATOR FREQUENCY BAND TO RECEIVE DUAL-BAND SIGNALS

BACKGROUND OF THE INVENTION

1. Field of the Invention

The present invention relates generally to Global Positioning System (GPS) receivers, and in particular, to a method and apparatus for a single local oscillator (LO) frequency band to receive dual-band signals.

2. Description of the Related Art

The use of GPS in consumer products has become commonplace. Hand-held devices used for mountaineering, automobile navigation systems, and GPS for use with cellular telephones are just a few examples of consumer products using GPS technology.

GPS-enabled devices, such as cellular telephones, have also been introduced into the consumer marketplace. These devices allow for the use of Location-Based Services (LBS) which are services, advertisements, and other features that are offered based on the location of the user. As such, GPS-enabled devices are used worldwide.

The use of the frequency spectrum in the United States is very tightly controlled by the government. However, several bands are in use for GPS, and other bands are used for devices that are used with GPS devices, such as cellular phones and Personal Data Assistants (PDAs). Thus, these devices, which are usually battery powered, must power both the GPS portion of the device and the other portion of the device, whether it is a cell phone or other electronic device.

Electronic devices usually use local oscillators (LO), for clocks or for downconversion processes. These LO components usually draw power, and usually are designed for a single frequency downconversion. However, when multiple functions are present in the same device, multiple LO components are typically used, since the devices are not designed with a single LO frequency plan in mind.

It can be seen, then, that there is a need in the art to make GPS-enabled devices with Local Oscillators capable of handling more than one frequency downconversion.

SUMMARY OF THE INVENTION

To minimize the limitations in the prior art, and to minimize other limitations that will become apparent upon reading and understanding the present specification, the present invention describes a single LO frequency source for use in dual-band GPS receivers. A frequency source in accordance with the present invention comprises a reference frequency source, a mixer, coupled to the reference frequency source, and a receiver, coupled to the mixer, wherein the receiver receives multiple frequency bands within the GPS system, and the reference frequency source is selected to downconvert the multiple frequency bands to a common downconversion frequency band.

Such a frequency source further optionally comprises the frequency output of the frequency source being selected to be at a frequency between a first frequency band and a second frequency band, the frequency output of the frequency source being selected to be used with a L1 band of frequencies and an L2 band of frequencies within the GPS system, the first frequency band being selected through image rejection, the first frequency band being selected through filtering, and the first frequency band being selected through switching.

A dual-band GPS receiver in accordance with the present invention comprises an antenna, a Radio Frequency (RF) section, coupled to the antenna, and a baseband section, coupled to the RF section, wherein the RF section comprises a receiver, the receiver receiving signals from a first GPS band of frequencies and a second GPS band of frequencies, a local oscillator having a local oscillator frequency, and a mixer, coupled to the receiver and the local oscillator, for selectively mixing the local oscillator frequency with the first GPS band of frequencies and a second GPS band of frequencies, wherein the local oscillator frequency downconverts the first GPS band of frequencies and the second GPS band of frequencies into a common downconversion frequency band.

Such a GPS receiver further optionally comprises the local oscillator frequency being at a frequency between the first GPS band of frequencies and the second GPS band of frequencies, the local oscillator frequency being selected to be used with a L1 band of frequencies and an L2 band of frequencies within the GPS system, the first frequency band being selected through image rejection, the first frequency band being selected through filtering, and the first frequency band being selected through switching.

A method for downconverting multiple bands of Global Positioning System (GPS) signals in a GPS receiver in accordance with the present invention comprises receiving a first signal in a first GPS frequency band, receiving a second signal in a second GPS frequency band, and downconverting both the first signal in the first GPS frequency band and the second signal in the second GPS frequency band with a local oscillator, wherein the local oscillator downconverts the first GPS frequency band and the second GPS frequency band into a common downconversion frequency band.

Such a method further optionally comprises a local oscillator frequency being at a frequency between the first GPS frequency band and the second GPS frequency band, the local oscillator frequency being selected to be used with a L1 band of frequencies and an L2 band of frequencies within the GPS system, the first frequency band being selected through image rejection, the first frequency band being selected through filtering, and the first frequency band being selected through switching.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Figure 1:
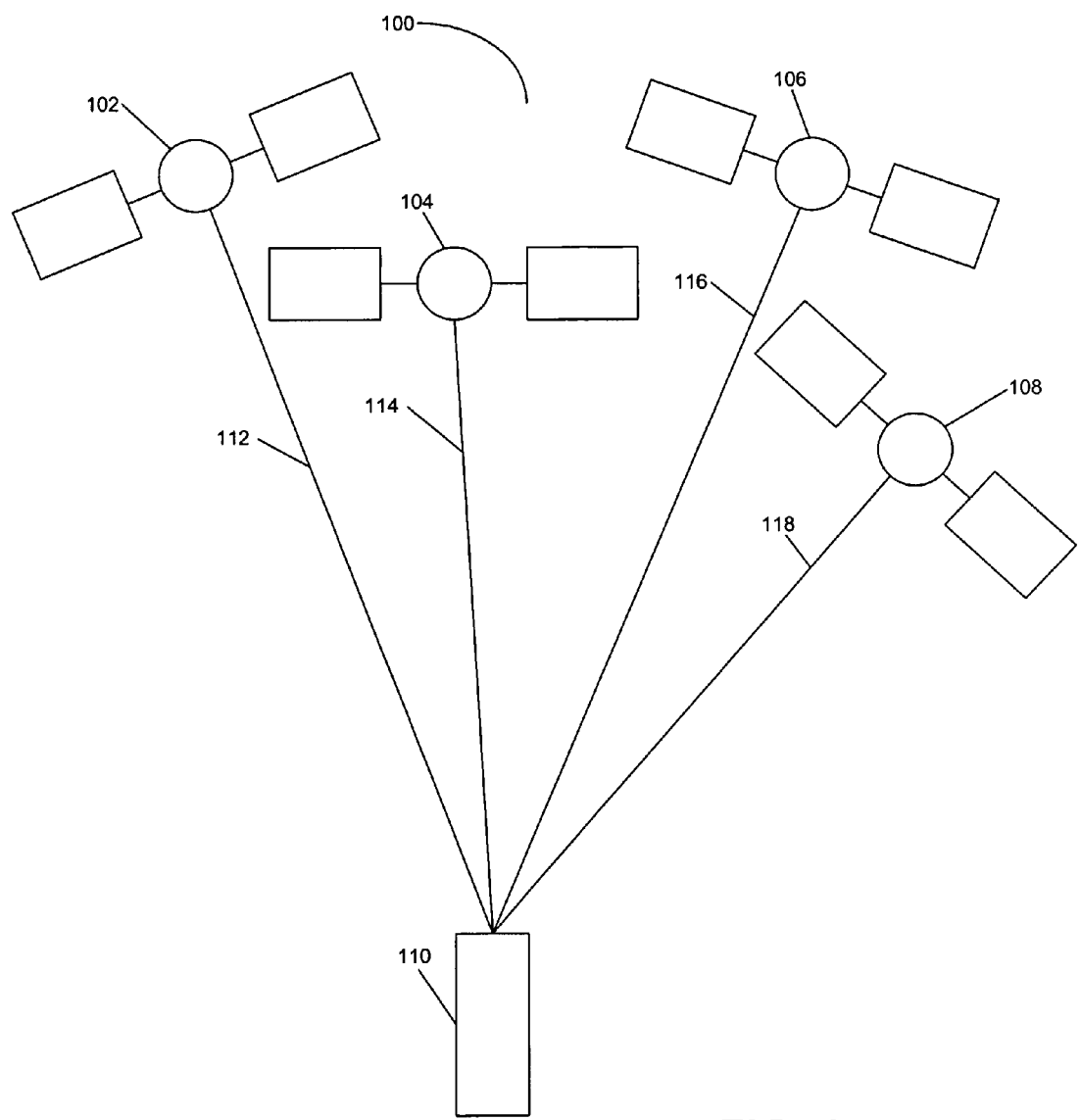
FIG. 1 illustrates a typical Satellite Positioning System in accordance with the present invention.

FIG. 1 illustrates a typical Satellite Positioning System in accordance with the present invention.

System 100 illustrates a constellation of satellites 102-108 and a receiver 110. Each of the satellites 102-108 transmits a signal 112-118 respectively, which signals 112-118 are received by receiver 110.

Signals 112-118 contain information such as time of transmission and system time for system 100. Receiver 110 uses the time it takes for signals 112-118 to travel the distances between the satellites 102-108 and receiver 110 and the data within signals 112-118 to determine the x, y, and z coordinates (geoposition) of receiver 110. This generic ranging system is typically known as the Global Positioning System (GPS), which is described in the related art.

The frequencies of interest in a GPS system 100 are in the "L-band" of frequencies, typically around 1575 MHz for the "L1" band, but other frequency bands, e.g., 1227 MHz for the L2 band, etc., and positioning systems and down conversions for other frequencies of interest can also benefit from the present invention.

Frequency Allocation

In a receiver, a LO, also referred to herein as a reference frequency source, is used to down-convert signals to an Intermediate Frequency (IF) stage, or directly to a baseband frequency, for additional signal manipulation. When the signals are transmitted in more than one frequency band, the LO needs to be tuned accordingly such that all of the down-converted signals are still in the same IF or baseband. Not only does this tuning of the LO increase the complexity of the LO design, it also forbids the receiver to receive a dual-band signal simultaneously as the LO can only be tuned to one of the two bands at a given time.

The present invention allows the receiver to receive to both bands with one fixed LO frequency, thus simplifying the LO design and is capable of receiving dual-bands simultaneously. Although described with respect to the L1 and L2 bands of the GPS system, other bands within the GPS system, e.g., L5, or other systems, can be used without departing from the scope of the present invention.

Figure 2:
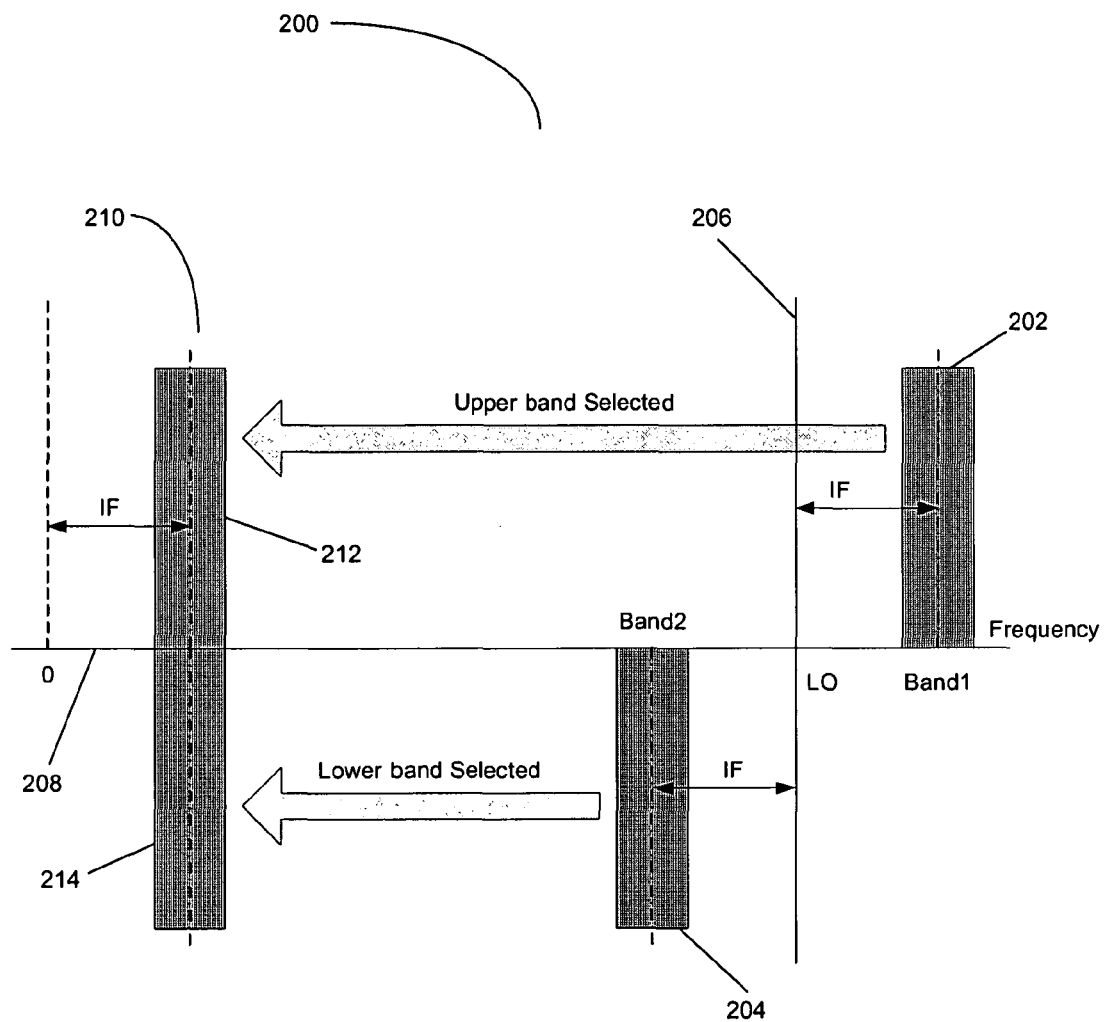
FIG. 2 illustrates a frequency band diagram in accordance with the present invention.

FIG. 2 illustrates a frequency band diagram in accordance with the present invention.

Using GPS frequency bands as an example, diagram 200 illustrates first GPS band 202 and second GPS band 204, and Local Oscillator (LO) frequency 206 on frequency spectrum 208. First GPS frequency band 202, namely the L1 signal, occupies the band centered at 1575.42 MHz, while second GPS frequency band 204, namely the L2 signal, occupies the band centered at 1227.6 MHz. Other GPS frequencies, such as L5 centered at 1175.45 MHz, can also be used with the present invention with corresponding changes in the LO frequency 206.

Conventional GPS receivers use LO frequencies 206 that either down-convert these signals to two different baseband signal frequencies, or to two different fixed IF signal frequency bands, which means the receiver cannot receive both bands simultaneously with only one LO frequency 206. The typical approach has been to use either one receiver switching between two frequency bands, or two separate receivers to receiver the two bands separately. Since Local Oscillators operate at high power levels with respect to the received signals, when two receivers are tuned to different frequencies, the separate LOs will likely interfere with each other. Due to the very weak signal power in GPS systems, this interference by LOs can severely degrade the receiver performance or even block the reception completely.

The present invention uses a LO frequency 206 at the center of L1 and L2 frequencies bands 202 and 204, which places LO frequency 206 at 1401.51 MHz. This LO down-converts both L1 and L2 signals 202 and 204 to a common frequency band 210, namely a frequency band centered at 173.91 MHz. The down conversion of the two bands 202 and 204 thus create similar frequency images 212 and 214 within the common band 210 with respect to this LO frequency 206.

The downconverter has image-reject capability such that only one of the two signals 212 and 214 is down-converted, but the other signal is rejected. The selected/rejected frequency can be easily switched. Conventional receivers use image-rejection to avoid interference, noise, etc., but not for band selection.

Figure 3:
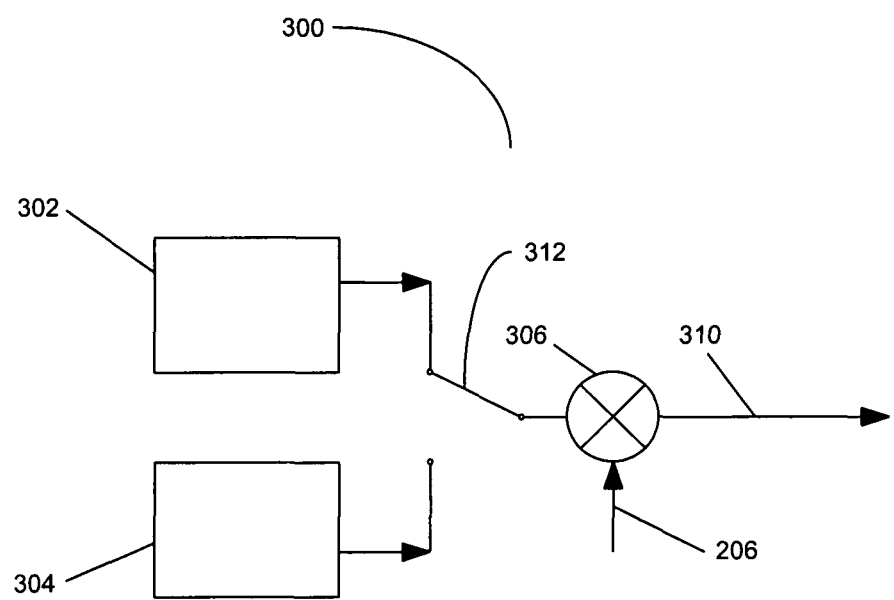
FIG. 3 illustrates a block diagram of an embodiment of a downconverter in accordance with the present invention.

FIG. 3 illustrates a block diagram of an embodiment of a downconverter in accordance with the present invention.

System 300 shows a first signal input 302, a second signal input 304, a mixer 306, a local oscillator signal 206, and output 310. Switch 312 is switched when the system 300 wants to switch bands from one band to another band, e.g., from the L1 band 202 to the L2 band 204.

The output of mixer 306 is two signals, i.e., the addition of the frequency of the input signal 202 or 304 and the frequency of the local oscillator signal 206, and the difference between the frequency of the input signal 202 or 304 and the frequency of the local oscillator signal 206. These signals on output 310 can then be bandpass filtered or low-pass filtered to only allow the difference between the frequency of the input signal 202 or 304 and the frequency of the local oscillator signal 206 to be sent on to the baseband section of the GPS receiver for further processing.

Figure 4:
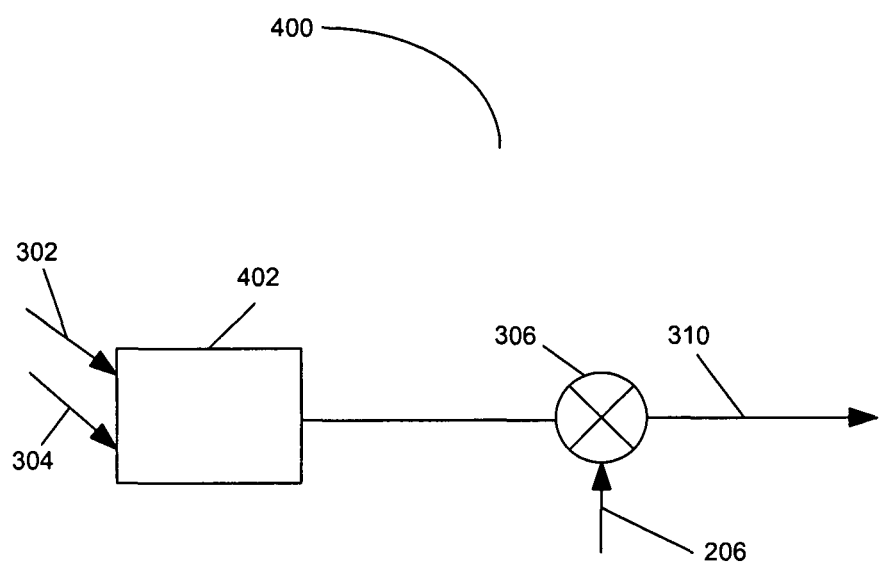
FIG. 4 illustrates a block diagram of another embodiment of a downconverter in accordance with the present invention.

FIG. 4 illustrates a block diagram of another embodiment of a downconverter in accordance with the present invention.

System 400 shows a first signal input 302, a second signal input 304, a mixer 306, a local oscillator signal 206, and output 310. Switchable filter 402 is switched when the system 400 wants to switch bands from one band to another band, e.g., from the L1 band 202 to the L2 band 204. In essence, switchable filter 402 is a bandpass filter that allows the passband to be switched from a passband centered on the L1 band 202 to a passband centered on the L2 band 204.

The output of mixer 306 is two signals, i.e., the addition of the frequency of the input signal 202 or 304 and the frequency of the local oscillator signal 206, and the difference between the frequency of the input signal 202 or 304 and the frequency of the local oscillator signal 206. These signals on output 310 can then be bandpass filtered or low-pass filtered to only allow the difference between the frequency of the input signal 202 or 304 and the frequency of the local oscillator signal 206 to be sent on to the baseband section of the GPS receiver for further processing.

By selecting the LO frequency 206 to be centered about the frequency bands of interest, the present invention allows for downconversion and processing of multiple frequency bands while lowering power consumption and minimizing possible interference sources.

Figure 5:
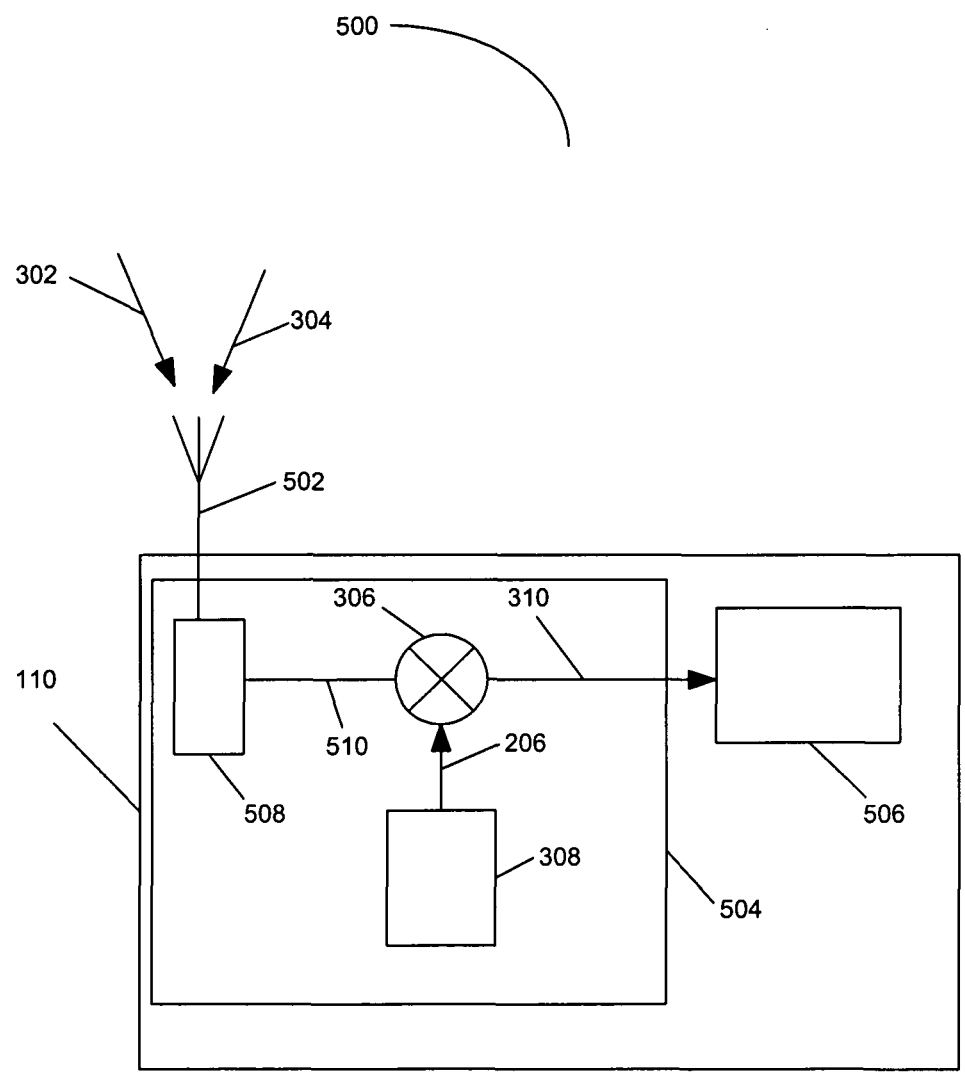
FIG. 5 illustrates a block diagram of a GPS receiver in accordance with the present invention.

FIG. 5 illustrates a block diagram of a GPS receiver in accordance with the present invention.

System 500 shows receiver 110 receiving first frequency band signal 302 and second frequency band signal 304 on antenna 502. The antenna is coupled to RF section 504 of GPS receiver 110, which is coupled to baseband section 506. Within RF section 504, the antenna is coupled to the receiver 508, which has as an output signal 510, which is fed into mixer 306 and mixed with LO 308 to generate IF signal 310. For use with the L1 and L2 bands, LO frequency 206 will be at approximately 1401.51 MHz. However, if the L1 and L5 bands are used, the LO frequency 206 will be at approximately 1375.935 MHz. Other band combinations within the GPS system, or with a GPS frequency and another frequency, are possible within the scope of the present invention.

Process Chart

Figure 6:
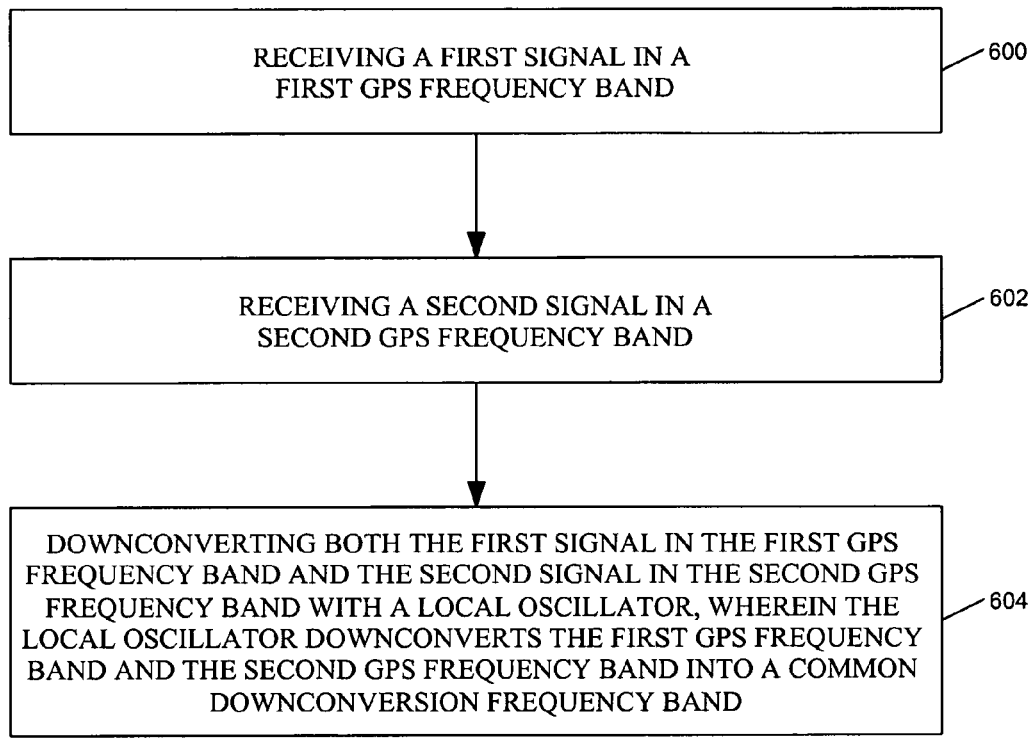
FIG. 6 illustrates a process chart illustrating the steps used to perform the present invention.

FIG. 6 illustrates a process chart illustrating the steps used to perform the present invention.

Block 600 illustrates receiving a first signal in a first GPS frequency band.

Block 602 illustrates receiving a second signal in a second GPS frequency band.

Block 604 illustrates downconverting both the first signal in the first GPS frequency band and the second signal in the second GPS frequency band with a local oscillator, wherein the local oscillator downconverts the first GPS frequency band and the second GPS frequency band into a common downconversion frequency band.

CONCLUSION

In summary, the present invention describes a single LO frequency source for use in dual-band GPS receivers. A frequency source in accordance with the present invention comprises a reference frequency source, a mixer, coupled to the reference frequency source, and a receiver, coupled to the mixer, wherein the receiver receives multiple frequency bands within the GPS system, and the reference frequency source is selected to downconvert the multiple frequency bands to a common downconversion frequency band.

Such a frequency source further optionally comprises the frequency output of the frequency source being selected to be at a frequency between a first frequency band and a second frequency band, the frequency output of the frequency source being selected to be used with a L1 band of frequencies and an L2 band of frequencies within the GPS system, the first frequency band being selected through image rejection, the first frequency band being selected through filtering, and the first frequency band being selected through switching.

A dual-band GPS receiver in accordance with the present invention comprises an antenna, a Radio Frequency (RF) section, coupled to the antenna, and a baseband section, coupled to the RF section, wherein the RF section comprises a receiver, the receiver receiving signals from a first GPS band of frequencies and a second GPS band of frequencies, a local oscillator having a local oscillator frequency, and a mixer, coupled to the receiver and the local oscillator, for selectively mixing the local oscillator frequency with the first GPS band of frequencies and a second GPS band of frequencies, wherein the local oscillator frequency downconverts the first GPS band of frequencies and the second GPS band of frequencies into a common downconversion frequency band.

Such a GPS receiver further optionally comprises the local oscillator frequency being at a frequency between the first GPS band of frequencies and the second GPS band of frequencies, the local oscillator frequency being selected to be used with a L1 band of frequencies and an L2 band of frequencies within the GPS system, the first frequency band being selected through image rejection, the first frequency band being selected through filtering, and the first frequency band being selected through switching.

A method for downconverting multiple bands of Global Positioning System (GPS) signals in a GPS receiver in accordance with the present invention comprises receiving a first signal in a first GPS frequency band, receiving a second signal in a second GPS frequency band, and downconverting both the first signal in the first GPS frequency band and the second signal in the second GPS frequency band with a local oscillator, wherein the local oscillator downconverts the first GPS frequency band and the second GPS frequency band into a common downconversion frequency band.

Such a method further optionally comprises a local oscillator frequency being at a frequency between the first GPS frequency band and the second GPS frequency band, the local oscillator frequency being selected to be used with a L1 band of frequencies and an L2 band of frequencies within the GPS system, the first frequency band being selected through image rejection, the first frequency band being selected through filtering, and the first frequency band being selected through switching.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but by the claims and the equivalents of the claims which form a part of this application.

What is claimed is:

1. A frequency source for use in a dual-band Global Positioning System (GPS) receiver having baseband circuitry configured to provide position information based upon transmissions from GPS satellites, comprising: a reference frequency source; a mixer, coupled to the reference frequency source and to the baseband circuitry; and a receiver, coupled to the mixer, wherein the receiver receives multiple frequency bands within the GPS system, the reference frequency source is selected to downconvert the multiple frequency bands to a common downconversion frequency band, and the mixer outputs a downconverted signal to the baseband circuitry.

2. The frequency source of claim 1, wherein the frequency output of the frequency source is selected to be at a frequency between a first frequency band and a second frequency band.

3. The frequency source of claim 2, wherein the frequency output of the frequency source is selected to be used with a L1 band of frequencies and an L2 band of frequencies within the GPS system.

4. The frequency source of claim 2, wherein the first frequency band is selected through image rejection.

5. The frequency source of claim 2, wherein the first frequency band is selected through filtering.

6. The frequency source of claim 2, wherein the first frequency band is selected through switching.

7. A dual-band GPS receiver, comprising: an antenna; a Radio Frequency (RF) section, coupled to the antenna; and a baseband section, coupled to the RF section, wherein the baseband section is configured to provide position information based upon transmissions from GPS satellites and wherein the RF section comprises a receiver, the receiver receiving signals from a first GPS frequency band and a second GPS frequency band; a local oscillator having a local oscillator frequency, and a mixer, coupled to the receiver and the local oscillator, for selectively mixing the local oscillator frequency with the first GPS frequency band and a second GPS frequency band, wherein the local oscillator frequency downconverts the first GPS frequency band and the second GPS frequency band into a common downconversion frequency band which is output to the baseband section.

8. The dual-band GPS receiver of claim 7, wherein the local oscillator frequency is at a frequency between the first GPS frequency band and the second GPS frequency band.

9. The dual-band GPS receiver of claim 8, wherein the local oscillator frequency is selected to be used with a L1 band of frequencies and an L2 band of frequencies within the GPS system.

10. The dual-band GPS receiver of claim 7, wherein the first GPS frequency band is selected through image rejection.

11. The dual-band GPS receiver of claim 7, wherein the first GPS frequency band is selected through filtering.

12. The dual-band GPS receiver of claim 7, wherein the first UPS frequency band is selected through switching.

13. A method for downconverting multiple bands of Global Positioning System (GPS) signals in a GPS receiver having a baseband section configured to provide position information based upon transmissions from GPS satellites, comprising: receiving a first signal in a first GPS frequency band; receiving a second signal in a second GPS frequency band; and downconverting both the first signal in the first GPS frequency band and the second signal in the second GPS frequency band with a local oscillator, wherein the local oscillator downconverts the first GPS frequency band and the second GPS frequency band into a common downconversion frequency band.

14. The method of claim 13, wherein a local oscillator frequency is at a frequency between the first GPS frequency band and the second GPS frequency band.

15. The method of claim 14, wherein the local oscillator frequency is selected to be used with a L1 band of frequencies and an L2 band of frequencies within the GPS system.

16. The method of claim 13, wherein the first GPS frequency band is selected through image rejection.

17. The method of claim 13, wherein the first GPS frequency band is selected through filtering.

18. The method of claim 13, wherein the first GPS frequency band is selected through switching.

* * * * *